Feb. 15, 1944.   H. KREIDEL   2,341,629
TUBE COUPLING
Filed April 3, 1941
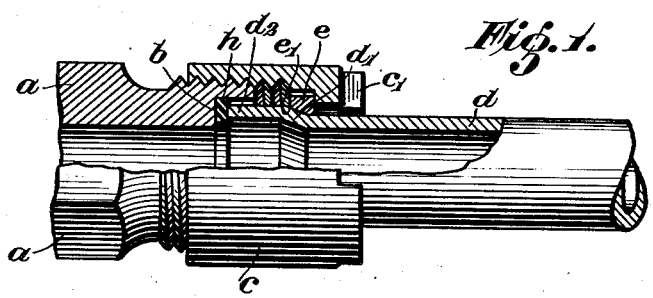
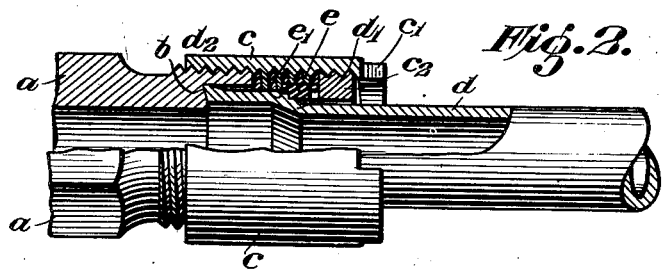
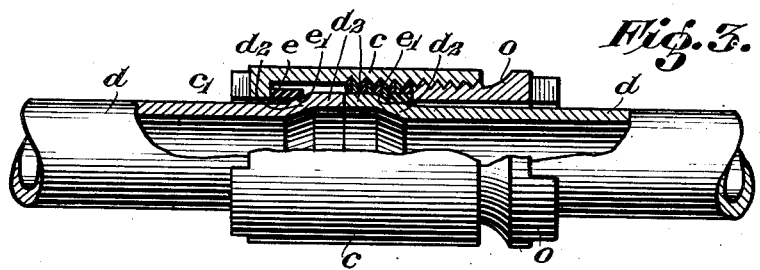
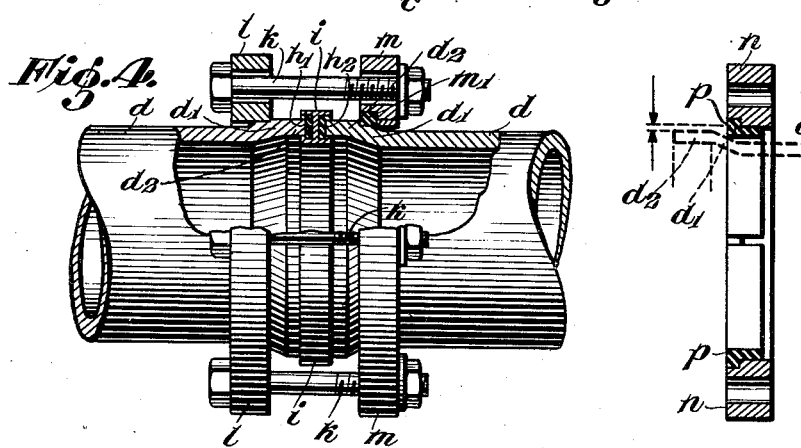 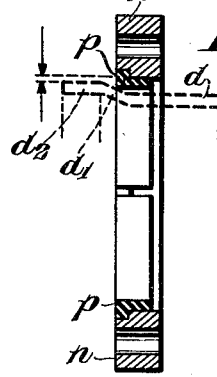
Inventor:
Hans Kreidel,
by Allen Holcombe
Attorney.

Patented Feb. 15, 1944

2,341,629

UNITED STATES PATENT OFFICE 2,341,629

TUBE COUPLING

Hans Kreidel, Wiesbaden, Germany; vested in the Alien Property Custodian

Application April 3, 1941, Serial No. 386,686
In Germany April 5, 1940

6 Claims. (Cl. 285—138)

The invention relates to a tube or pipe coupling according to my co-pending application, Serial No. 278,473, of June 10, 1939, referring to conically flared tube ends.

It is the object of the invention to provide a tube coupling in which the flared tube end has a cylindrical extremity which affords an additional stiffening.

A further feature is the provision of a tube coupling which is more resistant to mechanical stresses, as the distance of the contact face of the tube end face to be sealed from the point of application of the gripping edge at the outer surface of the tube may be made larger.

A further advantage is the provision of a tube coupling in which—although the tube is given but a slight expansion that should not be essentially greater than the wall thickness of the tube—the conically flared portion may be made shorter and thus steeper. In this manner the feed of the gripping ring during the tightening operation will be reduced so that it will be impossible for inaccuracies of the tube surface to make themselves felt any longer to an appreciable extent.

Other objects of the invention will appear from the following description, reference being had to the accompanying drawing, in which:

Fig. 1 is a quarter sectional view of a coupling connection in tightened condition having a shoulder stepped at right angles and a gasket in the coupling member;

Fig. 2 is a view similar to Fig. 1, showing a tube coupling having a relieved shoulder and gripping ring stepped on both sides, no separate gasket being provided;

Fig. 3 is a quarter sectional view of a tightened tube coupling in which the ends of the tubes to be sealed abut against each other and the gripping rings are acted upon by two tightening means to be threaded into each other;

Fig. 4 is a quarter sectional view of a flanged coupling, and

Fig. 5 is a sectional view of a connecting flange with a split gripping ring, the bore of flange being greater than the diameter of the greatest external diameter of the flared tube end.

According to my invention the conically flared tube terminates cylindrically in the diameter of the expansion. The thus obtained stepped expansion forms an appreciable stiffening of the tube end to be sealed to the effect that the danger of a subsequent deflection or deformation thereof during the tightening operation will be considerably diminished even in the case of softer and thin-walled tubes. Since the cylindrical extremity of the tube end may be made of any desired length, the tube may be stepped off on a longer way, thus the risk of collapsing will be considerably reduced if the pipe line is subjected to bending stresses or shaking movements.

$d$ denotes the tube and $d^1$ the flared portion thereof in all of the figures. $d^2$ is the tube end terminating cylindrically according to the invention in the diameter of the greatest expansion. The amount of expansion is only such that the internal diameter of the cylindrical extremity $d^2$ is suitably smaller than the external diameter of the unflared portion of the tube.

Lest the construction of the coupling connection becomes excessively long, the shoulder is incorporated in the coupling member $a$. In Fig. 1 showing a coupling such as may be used particularly for connecting comparatively hard, rigid tubes, the shoulder extends perpendicularly to the axis of the tube, being at the same time used for accommodating a separate gasket $h$ of conveniently softer material. The cap nut $c$ has a cylindrical outer surface and is at the front sides provided with grooves $c^1$ adapted to be engaged by the wrench. $e$ is the actual gripping ring.

For the connection of softer tubes, e. g., copper tubes, or the like, use is preferably made of a coupling, such as shown in Fig. 2. Here, the shoulder provided in the coupling member $a$ for the end face of tube to be sealed is slightly relieved. The tube which is axially stressed by the rectilinearly moved gripping ring $e$ on tightening the coupling is forced by its end into the relieved portion of the shoulder, whereby a particularly efficacious sealing rendering the use of a separate gasket superfluous will be obtained and, at the same time, the tube will be held from rotation with the coupling being tightened. In this embodiment the gripping ring $e$ is grooved at the front side so as to prevent the tube stock upset by clamping the gripping edge from being forced outwardly. In this manner the gripping ring is subjected to a positive limitation of its feed by the stock collecting in, and filling up, the annular groove; this might be of importance when using tubes of softer material, e. g., to prevent the gripping edges from penetrating the tube stock to an excessive depth. In order to be able to utilize the gripping ring $e$ on either side and to preclude defective assemblies likely to occur when inserting the gripping ring the wrong way, the annular groove is here provided on both end faces of the ring. Unlike the one-piece cap nut $c$ in the embodiment shown in Fig. 1, the shoulder for the gripping ring is here made a separate ring with external thread screwed into the cap nut c in order to save material.

The tube coupling shown in Fig. 3 is adapted to connect two tubes the faces of the flared ends of which abut direct against each other. In this case it is not necessary to use a coupling member having a separate shoulder. The co-action of the threaded members c and o engaging a gripping ring at a time and moving towards each other on being tightened will be readily seen from the illustration.

Also in the case of the flanged coupling shown in Fig. 4 the flared tube ends to be sealed are facing each other, but here is interposed a separate ring i the external edges of which project on either side and are used for securing the inserted gaskets $h^1$ and $h^2$. k are the bolts holding the flanges l and m together. The left hand flange l has an inner edge acting direct as hard gripping edge, whereas in the case of the right hand flange m the gripping edge forms part of a separate inserted ring $m^1$ of greater hardness which is sunk into a groove of the actual bore of flange.

The type of flange shown in Fig. 5 is adapted to be subsequently slipped over the flared tube end $d^1$, $d^2$ indicated by the dotted lines. The bore of this flange n has an internal diameter greater than the external diameter of the flared tube end $d^1$, $d^2$. In this case the actual gripping ring must be of the split type. The latter is here denoted as at $e^1$ and, like the flange n, will be subsequently slipped over the flared tube end or ends, then compressed and forced into the annular groove of the bore of flange.

I claim:

1. A coupling comprising a tube having a flared portion near the end to be coupled, said flared portion terminating in a cylindrical extremity having an internal diameter greater than the internal diameter of the tube but slightly less than that of the outer diameter of the tube, a member to which the tube is to be connected, said member having a sealing face cooperable with the end face of the cylindrical portion of said tube, a rigid ring having a sharp inner edge of diameter greater than the outer diameter of said tube but less than the outer diameter of said cylindrical end portion, and means cooperating with said member to force said ring longitudinally of said tube against the external surface of the flared portion thereof and thereby cause said sharp inner edge to bite into said flared portion and press the end of the cylindrical portion of said tube against the sealing face of said member.

2. The combination set forth in claim 1 in which the sealing face on said member is of frusto-conical shape sloping radially outwardly away from said tube and forms an annular recess for the reception of the extremity of the tube.

3. A tube or pipe coupling comprising two tubes in end to end relation, each of said tubes having an outwardly flared portion adjacent its end and a cylindrical end portion, the cylindrical end portions of said tubes being similar and of diameter slightly greater than the diameters of said tubes, a rigid ring surrounding each of said tubes and of lesser internal diameter than the external diameter of the cylindrical portions of the tubes, said rings having sharp inner edges engaging the outer surface of the flared portions of said tubes, and means to draw said rigid rings tightly toward each other, thereby to cause said sharp inner edge to bite into said outwardly flared portions and bring the ends of said cylindrical portions into firm engagement.

4. The combination set forth in claim 3 in which there is interposed between the ends of the tubes a member having a pair of oppositely facing annular channels and in which sealing gaskets engageable with the ends of said tubes respectively are positioned within the channeled member.

5. The combination set forth in claim 1 in which said rigid ring is of T-shaped section with its narrower cylindrical surface facing radially inwardly and wherein the overhanging portions of said ring are adapted to form abutments for metal displaced by the sharp edge.

6. The combination set forth in claim 1 in which said rigid ring has an annular internal rabbet in the face closest to the flared portion of the tube and the sharp inner edge is formed at the base of the annular rabbet whereby an abutment is provided for metal displaced from said flared portion and the penetration of said sharp edge is limited.

HANS KREIDEL.